(12) United States Patent
Keery et al.

(10) Patent No.: US 6,185,367 B1
(45) Date of Patent: *Feb. 6, 2001

(54) APPARATUS AND METHOD FOR STORING AND REPRODUCING HIGH-RESOLUTION VIDEO IMAGES

(75) Inventors: Peter A. Keery, Brewster; Susumu Murakami, Monsey, both of NY (US)

(73) Assignees: Sony Corporation, Tokyo (JP); Sony Electronics, Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/124,548

(22) Filed: Jul. 29, 1998

Related U.S. Application Data (62) Division of application No. 08/357,333, filed on Dec. 16, 1994, now Pat. No. 5,832,170.

(51) Int. Cl.[7] ........................................... H04N 5/91
(52) U.S. Cl. ............................ 386/122; 386/123; 386/125
(58) Field of Search ................................. 386/30, 31, 32, 386/45, 1, 37, 35, 36, 122, 123, 125; 358/906, 909.1; 348/207, 222, 262, 265, 267, 230, 232

(56) References Cited

U.S. PATENT DOCUMENTS

| | | |
|---|---|---|
| 3,524,012 | 8/1970 | Kiahara . |
| 3,560,635 | 2/1971 | Bruch . |
| 3,626,087 * | 12/1971 | Tomioka ................................. 386/29 |
| 3,852,520 | 12/1974 | Bruch . |
| 3,983,328 * | 9/1976 | Newell ................................... 386/89 |
| 4,220,971 * | 9/1980 | Lambeth ............................... 348/616 |
| 4,416,002 * | 11/1983 | Oguino et al. ..................... 360/77.07 |
| 4,467,368 * | 8/1984 | Horstmann ............................. 386/33 |
| 4,472,745 * | 9/1984 | Foerster et al. ........................ 386/26 |
| 4,553,176 | 11/1985 | Mendrala . |
| 4,646,166 * | 2/1987 | Arlan .................................... 386/44 |

(List continued on next page.)

*Primary Examiner*—Wendy Garber
*Assistant Examiner*—Aung S. Moe
(74) *Attorney, Agent, or Firm*—Frommer Lawrence & Haug, LLP.; William S. Frommer; Gordon Kessler

(57) ABSTRACT

High-resolution color and monochrome video images are recorded on and reproduced from a record medium. Red, green and blue signal components are recorded as respective monochrome-like signals in separate tracks, and since a chrominance component of the video signal is not recorded in each track, the bandwidth of the recorded video signal may exceed the bandwidth of a video signal that normally is stored on the record medium. The high-resolution color video signal is reproduced by reproducing three frames which contain the red, green and blue signal components, respectively, and by supplying these signal components as a single high-resolution color image. A high-resolution monochrome video signal is stored by sampling the monochrome video signal at a given clock signal to produce a first sampled signal and by sampling the monochrome video signal at an inverse clock signal to produce a second sampled signal which are recorded as separate monochrome frames. Upon reproduction, two frames corresponding to the two sampled signals are reproduced and combined in accordance with the clock and inverse clock signals to produce a high-resolution monochrome video image.

18 Claims, 3 Drawing Sheets

U.S. PATENT DOCUMENTS

| | | |
|---|---|---|
| 4,736,244 | 4/1988 | Shiota et al. . |
| 4,774,599 * | 9/1988 | Baumeister .......................... 386/110 |
| 4,785,358 * | 11/1988 | Ninomiya ............................. 386/122 |
| 4,829,368 | 5/1989 | Kobayashi et al. . |
| 4,858,025 * | 8/1989 | Tabei ...................................... 386/85 |
| 4,868,679 | 9/1989 | Kanamaru . |
| 4,914,746 | 4/1990 | Nishi et al. . |
| 4,951,155 * | 8/1990 | Andrews ............................. 386/106 |
| 4,959,710 | 9/1990 | Uehara et al. . |
| 5,136,391 * | 8/1992 | Minami ................................. 386/33 |
| 5,162,922 * | 11/1992 | Takemura et al. ................... 386/109 |
| 5,175,630 * | 12/1992 | Tabuchi et al. ........................ 386/92 |
| 5,206,717 * | 4/1993 | Sakata et al. ........................ 348/264 |
| 5,253,076 * | 10/1993 | Adachi ................................. 386/122 |
| 5,257,254 * | 10/1993 | Kutaragi ................................ 369/50 |
| 5,276,528 * | 1/1994 | Ishikawa et al. ...................... 386/16 |
| 5,363,264 * | 11/1994 | Cavanaugh et al. ................. 386/110 |
| 5,521,637 | 5/1996 | Asaida et al. . |
| 5,682,457 * | 10/1997 | Woo et al. ............................. 386/95 |
| 5,832,170 * | 11/1998 | Keery et al. ........................... 386/32 |

* cited by examiner

APPARATUS AND METHOD FOR STORING AND REPRODUCING HIGH-RESOLUTION VIDEO IMAGES

This application is a divisional of U.S. Ser. No. 08/357,333 filed Dec. 16, 1994 now U.S. Pat. No. 5,832,170.

BACKGROUND OF THE INVENTION

The present invention relates to a laser disk video image recording/reproducing device and, more particularly, to apparatus and method for storing and reproducing high-resolution video images to and from a record medium.

Still and motion video images may be stored on a variety of record media, including magnetic tapes, magnetic-type diskettes, e.g., floppy and hard diskettes, optical disks, magneto-optical compact disks (CD-MOs), etc. The type of record medium utilized generally depends on the needs of the user, for example, video images are generally stored in analog form on a magnetic tape medium when real time recording/reproducing of motion video is desired and low to medium quality reproductions of the stored video signals are acceptable. On the other hand, still and motion video images commonly are digitally stored on a magnetic tape medium or a magnetic disk when it is desired to reproduce and supply accurate copies of the stored video images.

Video tape recorders (VTRs) store a video image on a single track either as a composite video signal (in standard VTRs) or as an S-video signal (in S-VTRs). Typically, a composite video signal having a bandwidth of 3 MHz and an S-video signal having a bandwidth of 4 MHz may be stored on a magnetic tape by conventional, commercially available video tape recorders. Digital video tape recorders (DVTRs) digitize and compress the video signal prior to recording and generally store each compressed image on several tracks on a magnetic tape. Video images may also be stored as digital signals on magnetic disks and compact disks or may be stored as analog signals on optical disks.

One important application of video image storage and retrieval is the archiving, i.e., permanent storage, of still and/or motion video images, which is especially important in the fields of medicine, publishing, etc. The storage of high-resolution video images is necessary in certain applications, for example, archiving pathology microscope images. Present high-resolution cameras produce video signals having bandwidths greater than 7 MHz; and the produced high-resolution video images may have a resolution in excess of 700 horizontal lines.

One difficulty encountered in current video image storage and retrieval devices is the general inability to store a substantial number of high resolution video images on a record medium. As discussed above, "S" video tape recorders are capable of recording video signals having a bandwidth of 4 MHz onto a magnetic tape; and laser disk recorders are capable of recording color video signals having a bandwidth of 4.5 MHz. Other devices that digitally record video signals reduce the amount of information in the video signal at least by half since those portions of the signal which are not sampled, at any clock rate, are not recorded. Presently available digital systems generally compress video images to increase the recording capacity of a magnetic tape medium, however, the compressed video images generally are not high-resolution images with a 7 MHz bandwidth.

Digital systems using a hard drive are known to store and retrieve data to and from a hard disk in a random-access type manner. However, hard drives generally are incapable of storing a substantial number of high-resolution video images on a single hard disk due to the limited storage capacity of such disks. For example, an uncompressed color video image which has a 768 by 490 pixel resolution requires 1,128,960 bytes of storage (one byte for each red, green and blue value), thus resulting in 22,579,200,000 bytes (more than 22 gigabytes) of storage for 20,000 images. A 5¼ inch MO drive (CD-MO) may record approximately 1200 images on a compact disk having a storage capacity of 640 megabytes/side.

Another difficulty encountered in commercially available video image storage and retrieval devices is their general inability to reproduce a high resolution video image quickly. Typically, magnetic-type hard drives require at least several seconds, at best, to retrieve a high-resolution video image.

A further difficulty encountered in current video image storage and retrieval devices is their general inability to store a substantial number of high resolution monochrome (black and white) video images on a record medium. Similar to the storage of high-resolution color video images, the above-discussed devices generally are unable to store a substantial number, e.g., 20,000, of high-resolution, e.g., 10 MHz bandwidth, monochrome video images on a record medium.

OBJECTS OF THE INVENTION

Therefore, it is an object of the present invention to provide apparatus and method for storing and reproducing high-resolution video images which overcome the shortcomings of the above described devices.

Another object of the present invention is to provide apparatus and method for storing and reproducing a substantial number of high-resolution video images to and from a single record medium.

A further object of the present invention is to store video images that have a bandwidth that exceeds the bandwidth of images generally stored on a record medium.

An additional object of this invention is to quickly reproduce high-resolution video images from a record medium.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, apparatus and method are provided for storing a high-resolution color video signal (e.g., having at least 700 lines of horizontal resolution) on a record medium (e.g, a write-once laser disk) having areas for storing frames of the color video signal. The apparatus and method operate to receive a color video signal having red, green and blue signal components (e.g., from three CCD (charge coupled device) pickups), and to record (e.g., as separate individual frames) the red, green and blue signal components of the color video signal in respective different areas of the record medium.

As one aspect of the present invention, the red, green and blue signal components of the color video signal are recorded on the record medium in a monochrome mode.

As another aspect of this invention, a frame of a color video signal is recorded with a bandwidth that exceeds the bandwidth of a color video signal normally recorded on the record medium.

As yet a further aspect of this invention, 20,000 color video images each having at least 700 horizontal lines of resolution may be recorded on a single record medium.

In accordance with another embodiment of the present invention, apparatus and method for reproducing a high-resolution color video signal (e.g., having at least 700 lines of horizontal resolution) from a record medium operate to reproduce red; green and blue signal components of the color video signal from separate areas of the record medium, and supply the reproduced red, green and blue signal components as one frame of a high-resolution color video image with a bandwidth that exceeds the bandwidth of a signal normally stored on the record medium.

In accordance with a further embodiment of the present invention, apparatus and method for storing a high-resolution monochrome video signal (e.g., having at least a 7 MHz bandwidth) on a record medium (e.g., a write-once laser-disk) operate to sample the monochrome video signal at each pulse of a given clock signal to produce a first sampled video signal and at each pulse of an inverse of that clock signal to produce a second sampled video signal, and to record the first and second sampled video signals in respective different areas of the record medium.

In accordance with still another embodiment of the present invention, apparatus and method for reproducing a monochrome video signal from a record medium operate to reproduce first and second signal components of the monochrome video signal from separate areas of the record medium in synchronism with a given clock signal and the inverse of that clock signal, the reproduced first and second signal components being combined to produce a high-resolution monochrome video signal.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 1:
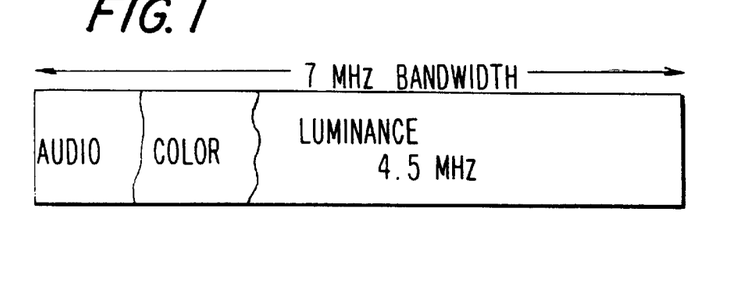
FIG. 1 illustrates the bandwidth of a recorded color video signal.
Figure 2:
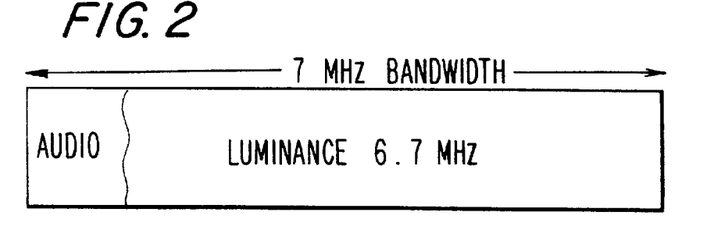
FIG. 2 illustrates the bandwidth of a recorded monochrome video signal.

The signal composition of a color video signal generally consists of a luminance component that contains the image brightness information and a chrominance component or components that transmit the two color parameters, hue and saturation or color purity. Commercially available analog video recorders, e.g., analog video tape recorders (VTRs) and analog laser disk recorders, generally have recording bandwidths of 7 MHz of which the luminance component occupies approximately a 4.5 MHz bandwidth and the remainder is reserved for the chrominance component (i.e., color) and the audio signals. FIG. 1 schematically illustrates the bandwidth of a video signal representing a single color image stored by an analog video recorder. Several types of analog video recorders also are capable of recording higher-resolution monochrome signals by utilizing for the monochrome signal the bandwidth generally reserved for the chrominance component. As shown schematically in FIG. 2, a monochrome video signal having a luminance component with a bandwidth of 6.7 MHz may be recorded.

When high-resolution color video signals, e.g., 7.0 MHz bandwidth, are recorded as composite or S-video signals, each video frame is recorded at a reduced bandwidth due to the presence of the chrominance component. In accordance with the present invention, if the video signal contained only a luminance component, e.g., a black and white signal, the recording bandwidth could be expanded.

Standard RGB video signals consist of a red-primary signal that contains red color information, a green-primary signal that contains green color information, and a blue-primary signal that contains blue color information. These three primary signals are, in essence, three luminance signals in which each individual color signal carries the luminance information pertaining to its respective color. The main difference between the three primary color signals, red, green and blue, and a true luminance signal is RGB "luminance" levels range from 0 to 0.7 volts and true monochrome luminance levels range from 0 to 1 volt. Therefore, and in accordance with the present invention, if the three primary signals of the color video signal are recorded as three separate monochrome-like signals in three separate image areas, a color video image having a greater bandwidth may be recorded on a record medium (further described below).

Figure 3:
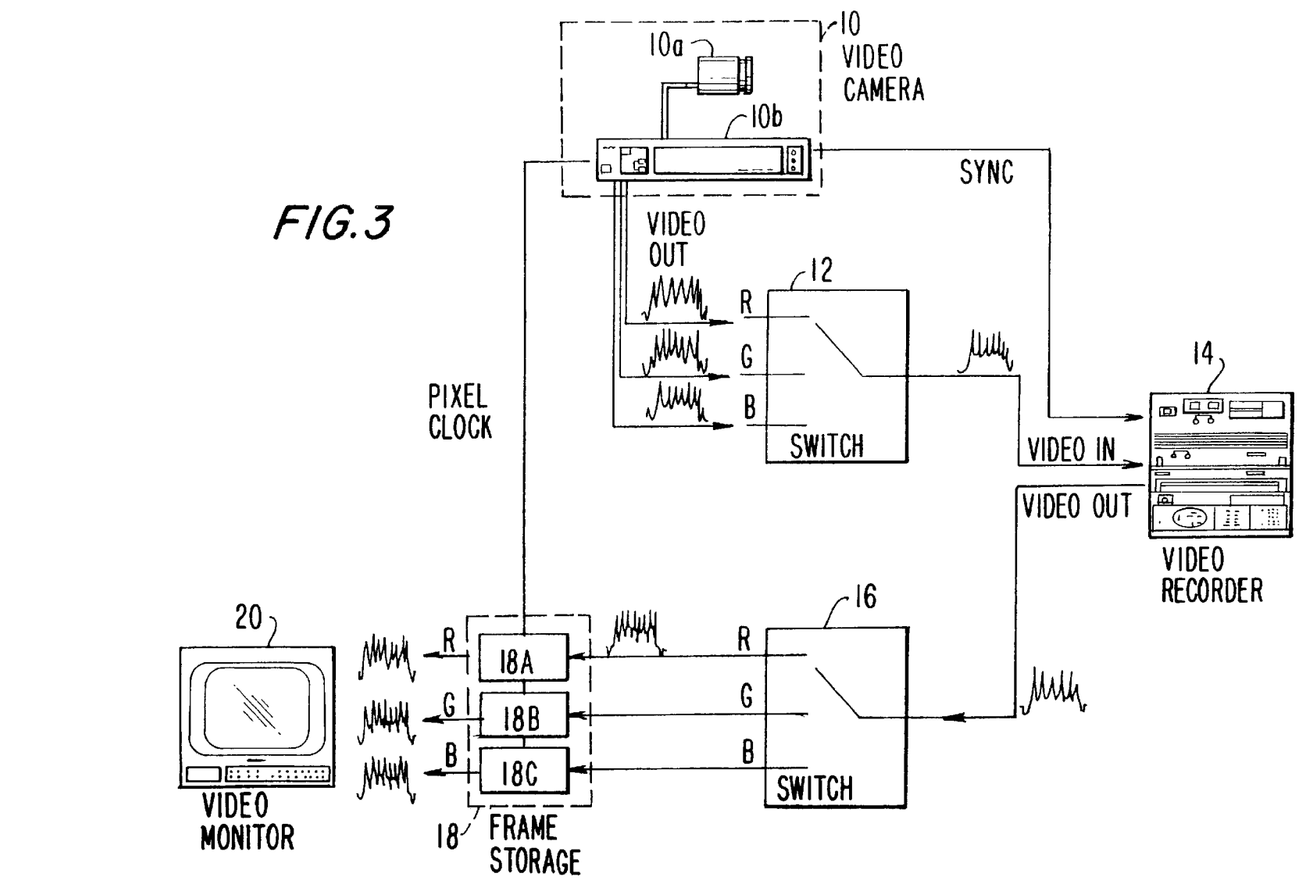
FIG. 3 is a schematic diagram of apparatus for storing and reproducing high-resolution color video images in accordance with the present invention.

Referring now to FIG. 3, a schematic diagram of apparatus for storing, reproducing and displaying high-resolution color video images in accordance with the present invention is illustrated. As shown, the apparatus is comprised of a video camera 10, a first video switch 12, a video recorder 14, a second video switch 16, a three frame storage device 18, and a high-resolution video monitor 20.

Video camera 10 is a high resolution camera that delivers high-resolution video images and generally includes a camera head 10a which has three charge coupled devices (CCDs) that produce red, green and blue primary output signals, respectively, from an image focused on the camera and a camera control unit 10b which performs signal processing on the primary output signals, which may include image enhancement, color correction, gamma correction, synchronization (sync) adding, encoding, etc. An exemplary high-resolution video camera which may be utilized in the present invention is Sony's DXC-760MD 3-chip CCD color video camera whose three CCDs each are capable of producing an image signal whose bandwidth is 7 MHz and whose resolution is 560 horizontal lines of resolution. The green CCD is generally offset by ½ pixel to produce a perceived resolution in the green image signal of 750 horizontal lines.

It is appreciated that other video sources other than video cameras may be utilized with the present invention, for example, a digital recorder or other device which supplies high-resolution video signals known in the art. However, for purposes of describing the present invention, the high-resolution video signals are produced and supplied by video camera 10.

High resolution video cameras encode the image signals produced thereby by converting the three primary signals into composite NTSC, PAL, or SECAM signals. However, and in accordance with the present invention, video camera 10 supplies the three primary signals as three separate signals to video switch 12. In addition, video camera 10 adds the usual horizontal and vertical synchronizing signals to each of the three primary signals to produce "RGB sync on all" signals and supplies sync signals to video recorder 14 for synchronization purposes during recording of the video signals (to be described). Alternatively, the three primary signals may be supplied to a sync adder device (not shown) which adds the horizontal and vertical synchronizing signals to each color signal. Video camera 10 continues to supply the three primary signals that represent a single image (i.e., frame) to video switch 12 until all three primary signals are recorded by video recorder 14 (to be described).

Video switch 12 is a three-state selectable switch that is switchable between one of three conditions which correspond to the red, green and blue primary signals supplied from video camera 10. Video switch 12 transmits the selected (switched) primary signal to video recorder 14. Video switch 12 may be a manually controlled switch in which an operator manually selects the input signal (R, G or B) to be supplied to the switch's output or an automatically controlled switch which selects the input signal in response to a control signal (not shown) supplied by, for example, a controller (not shown). In accordance with the present invention, video switch 12 supplies the red primary signal to video recorder 14 until the red primary signal is recorded, then supplies the green primary signal to video recorder 14 until the green primary signal is recorded, and then supplies the blue primary signal to video recorder 14 until the blue primary signal is recorded. That is, the supply of a primary signal to video recorder 14 is not interrupted while that primary signal is being recorded (of course, the recorder may include one or more buffers to store temporarily the primary signal supplied by switch 12). However, the three primary signals may be supplied in any predetermined order, and further, video switch 12 may be any known switch capable of supplying one of three input video signals to video recorder 14.

In one embodiment, video recorder 14 is a standard analog video recorder which records each video image in analog form on a record medium. As previously stated, video recorder 14 records the red primary signal as a "red monochrome" signal, which corresponds to a single "red" image, in a single track on the record medium. Similarly, the green and blue primary signals are recorded as "green monochrome" and "blue monochrome" signals, respectively, in separate tracks on the record medium. Video recorder 14 is operable to record video signals in a color mode and in a monochrome mode: luminance and chrominance signals (and perhaps audio signals) are stored on each track in the color mode and a luminance signal with an expanded bandwidth (and perhaps audio signals) is stored (without a chrominance signal) on each track in the monochrome mode. In accordance with the present invention, video recorder 14 records the three primary signals of the high-resolution color image in the monochrome mode and utilizes the sync signals supplied from video camera 10 to synchronize the recording of each signal supplied. Alternatively, video switch 12 may utilize the sync signals added to each primary signal for synchronizing purposes. Generally, a signal which has a 6.7 MHz bandwidth may be stored in each track on the record medium in the monochrome mode.

Figure 4:
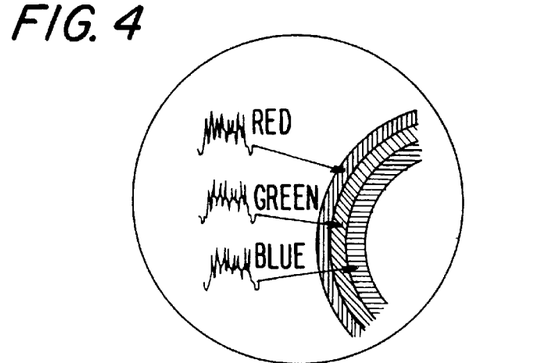
FIG. 4 is a schematic diagram of the data format of a record medium in accordance with the present invention.

In a preferred embodiment of the present invention, video recorder 14 is a write-once laser disk recorder which records video signals on an optical disk. Generally, recording is accomplished in a laser disk recorder by projecting a laser beam onto the recording surface of an optical disk thus heating the exposed area to cause a phase change in the recording layer, thereby increasing the reflectivity of the heated area. Currently, laser disk recorders can record as many as 87,000 NTSC uncompressed images on a single optical disk (43,500 images per side). In accordance with the present invention, each primary signal (RGB) of a high-resolution color image is stored as a separate image which results in a high-resolution color image being stored in three tracks on the optical disk. When each track on the disk is, for example, a concentric circle, the red, green and blue primary signals are stored in the manner illustrated in FIG. 4. As shown, the red primary signal is recorded on the outermost track of the three tracks, the green primary signal is recorded on the middle track, and the blue primary signal is recorded on the innermost track of the three tracks. However, this format is illustrative of only one recording format, and the three primary signals may be stored in any order on adjacent or non-adjacent tracks on the record medium.

The laser disk recorder may record as many as 29,000 uncompressed high-resolution color images on a single optical disk (14,500 images per side). Since images are not substantially compressed prior to such laser disk recording, complex compression circuitry is not necessary, and thus, compression and decompression errors in the video signals are prevented. On the other hand, digital recorders generally require digital video signals to be compressed prior to recording so as to record a greater number of images on a record medium, thereby increasing the likelihood of errors in the reproduced video signals.

One exemplary laser disk recorder which may be utilized in the present invention is Sony's LVR-5000/LVS-5000 laser videodisc recorder, which is a write-once analog recorder and which records in each track of the optical disk a luminance signal with a 4.5 MHz bandwidth when operating in the color mode and a luminance signal with a 6.7 MHz bandwidth when operating in the monochrome mode. In the monochrome mode, an audio signal and a video signal having 536 horizontal lines of resolution are recorded on each track, or a video signal having 560 horizontal lines of resolution (7.0 MHz bandwidth), without an audio signal, is recorded on each track. As previously stated, since each primary (RGB) signal is recorded as one monochrome frame, 29,000 uncompressed high-resolution color images may be recorded on a single optical disk. A magnetic disk or a magneto-optical disk would require approximately 32 gigabytes of recording capacity to store 29,000 uncompressed high-resolution (e.g., 768 by 490 pixel resolution) digital images (768×490×3 (RGB)×29,000 images).

Reproduction of high-resolution color images stored on a record medium in accordance with the present invention will now be discussed with reference to FIG. 3. Video recorder 14, which includes a playback capability and, for the purpose of describing this playback capability, is referred to as a player, reproduces, one at a time, each of the primary signals from the record medium, e.g., an optical disk, and supplies the reproduced video signals to video switch 16. When player 14 is a laser disk player, a typical maximum access time to reproduce a video image is one second. That is, the amount of time for the player to perform a full stroke (e.g., to travel from the outermost track of the disk to the innermost track) and to reproduce the three tracks containing the respective red, green and blue primary signals is, at most, one second. However, average reproduction times are approximately 0.6 seconds. Other video reproduction devices, e.g., a hard drive, have access times of at least several seconds to reproduce equivalent high-resolution video images.

Video switch 16 is a three-state selectable switch that supplies a signal supplied from player 14 to three frame storage device 18 which stores the three reproduced primary signals corresponding to a single high-resolution color image in respective different frame storage units 18A, 18B and 18C. As shown, video switch 16 supplies a reproduced red primary signal to frame storage unit 18A, supplies a reproduced green primary signal to frame storage unit 18B, and supplies a reproduced blue primary signal to frame storage unit 18C. Similar to video switch 12, video switch 16 may be a manually controlled switch, in which an operator manually selects the frame storage unit to which the reproduced signal is supplied, or an automatically controlled switch, which automatically supplies the reproduced signal to a designated frame storage unit in response to a control signal (not shown) supplied by, for example, a computer (not shown).

Each of the three frame storage units 18A, 18B and 18C of storage device 18 may include a frame capture circuit board, or the equivalent, which is capable of "grabbing" a monochrome video signal having a resolution of 560 horizontal lines (i.e., a 7 MHz bandwidth), which corresponds to a 768 by 490 pixel resolution. In a preferred embodiment of the present invention, each frame storage unit 18A, 18B, 18C "mirrors" a respective CCD of video camera 10, that is, the frame storage units store contain the same primary signals as produced by video camera 10. In addition, video camera 10 supplies a pixel clock signal to storage device 18 in order to synchronize the storage of the reproduced signals in the respective frame storage units 18A, 18B, 18C. The three frame storage units 18A, 18B and 18C store the respective primary signals supplied by video switch 16 in response to control signals (not shown) supplied by, for example, a computer (not shown).

Upon "grabbing" respective primary signals, the three frame storage units of storage device 18 supply the stored primary signals to a high-resolution video monitor 20 which displays the high-resolution color video image. One example of a high-resolution color video monitor is Sony's PVM-1353MD which is a medical video monitor capable of displaying a color image having a resolution of 800 horizontal lines (10 MHz bandwidth). Alternatively, a video signal converter (not shown) may convert the RGB signal (i.e., the three primary signals) to Y/C or a composite signal before being supplied to video monitor 20.

Figure 5:
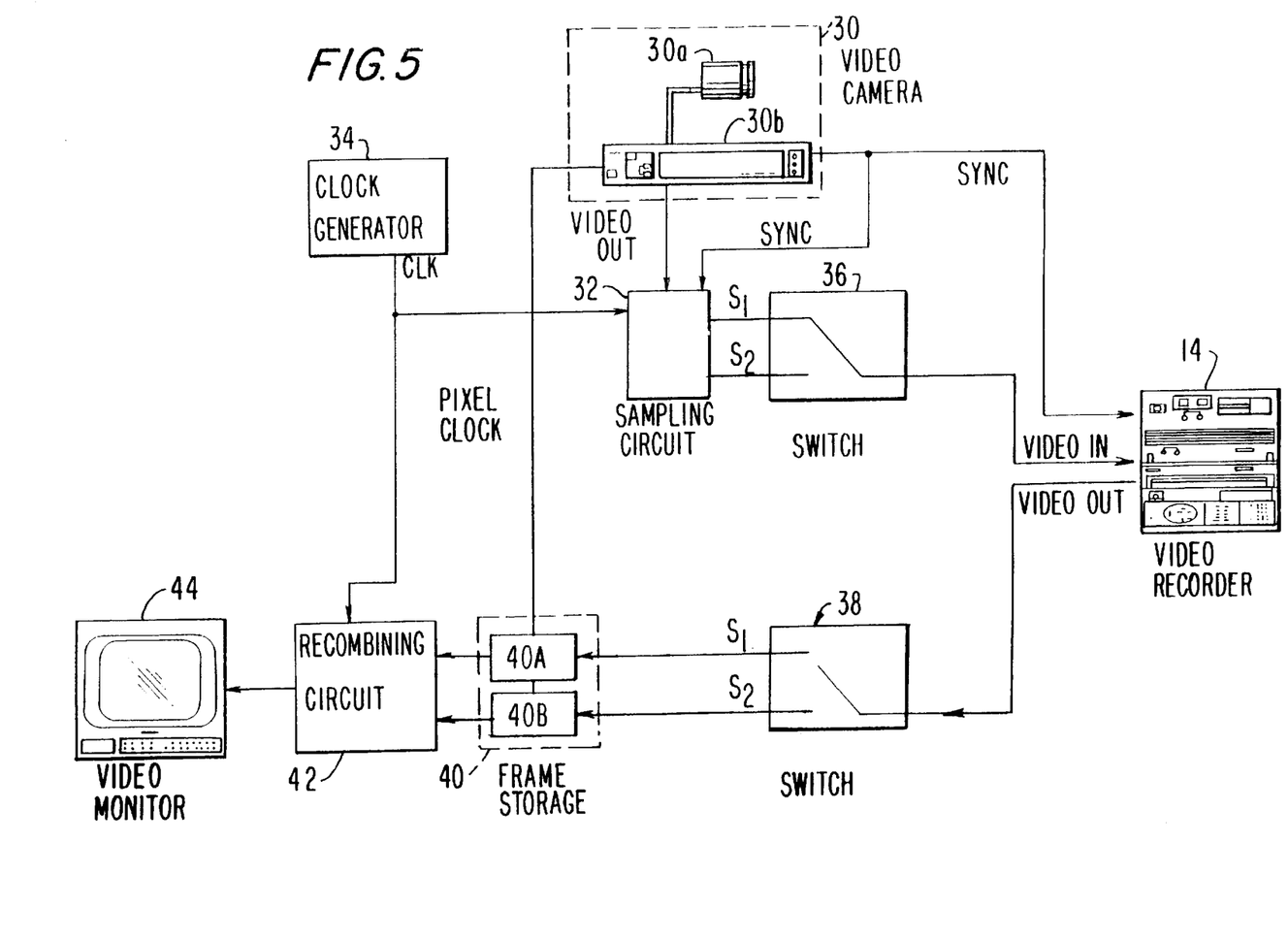
FIG. 5 is a schematic diagram of apparatus for storing and reproducing high-resolution monochrome video images in accordance with the present invention.

FIG. 5 is a schematic diagram of apparatus for storing and reproducing high-resolution monochrome video images in accordance with another embodiment of present invention. Video recorder 14 is similar to that of FIG. 3. As shown, the apparatus is comprised of a monochrome video camera 30, a sampling circuit 32, a clock generating circuit 34, a video switch 36, video recorder 14, a second video switch 38, a two frame storage device 40, a recombining circuit 42 and a high-resolution monochrome video monitor 44.

Video camera 30 is a high resolution monochrome camera which delivers high-resolution monochrome images having, for example, a 10 MHz bandwidth. Similar to video camera 10 shown in FIG. 3, video camera 30 generally includes a camera head 30a that produces a monochrome output signal from an image focused on the camera and a camera control unit 30b which performs signal processing on the monochrome output signal, such signal processing being well known in the art.

Figure 6:
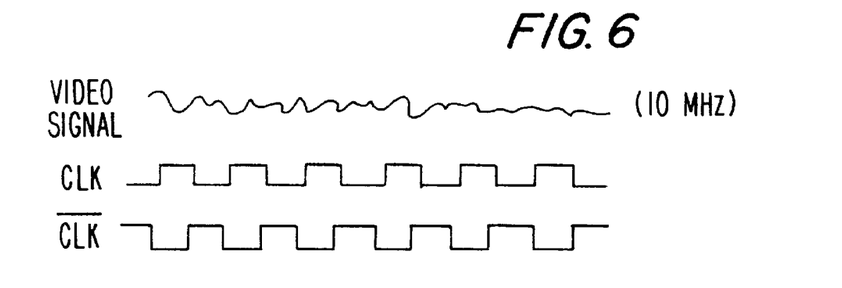
FIG. 6 are signal diagrams useful in understanding the present invention.

Video camera 30 supplies the monochrome signal and a sync signal to sampling circuit 32 which performs two samplings of the monochrome signal (described below) at a rate indicated by clock signal CLK which is produced and supplied from clock generating circuit 34. Clock generating circuit 34 generates clock signal CLK with a predetermined clock rate, and may be any suitable device capable of producing the clock signal CLK. Alternatively, a computer (not shown), or equivalent control system, may produce and supply clock signal CLK. Sampling circuit 32 samples the monochrome signal at the supplied clock rate to produce a first sampled signal $S_1$, and also samples the monochrome signal at $\overline{CLK}$ (the inverse, or complement, of CLK) to produce a second sampled signal $S_2$. That is, the monochrome video signal is sampled at each instant that clock signal CLK is, for example, high to produce signal $S_1$ and is sampled at each instant the inverse clock signal ($\overline{CLK}$) is high to produce signal $S_2$. The clock signal wave forms are illustrated in FIG. 6. Clock generating circuit 34 may generate and supply the inverse clock signal ($\overline{CLK}$); and the clock and inverse clock signals CLK and $\overline{CLK}$ also are supplied to recombining circuit 42.

Sampling circuit 32 supplies sampled signals $S_1$ and $S_2$ to video switch 36. In addition, sampling circuit 32 may add the synchronizing signal sync to each sampled signal so that each signal "appears" to be a true monochrome signal comprised of image information and synchronizing information. Video camera 30 continues to supply a frame of the monochrome signal to sampling circuit 32 until both sampled signals $S_1$ and $S_2$ are recorded by video recorder 14, whereupon the video camera supplies the next frame to the sampling circuit.

Video switch 36 is a two-state selectable switch that is switchable between one of two conditions in order to supply either sampled signal $S_1$ or sampled signal $S_2$ to video recorder 14. Similar to video switch 12 (FIG. 3), video switch 36 may be a manually controlled switch or an automatically controlled switch controlled by a control signal from, for example, a computer (not shown). In accordance with this embodiment of the present invention, video switch 36 supplies the first sampled signal $S_1$ to video recorder 14 until it is recorded, and then supplies the second sampled signal $S_2$ to video recorder 14 to be recorded.

As previously described, video recorder 14 is an analog video recorder which records each video signal as a separate video frame on a record medium (e.g., an optical disk). Video recorder 14 records the first sampled signal $S_1$ as a monochrome signal in a single track and records the second sampled signal $S_2$ also as a monochrome signal in a different single track on the record medium. Therefore, and in accordance with the present invention, a monochrome signal having a bandwidth of 14 MHz may be recorded on the record medium since each sampled signal (7 MHz each) is recorded as a separate frame.

As previously discussed, a laser disk recorder may record as many as 87,000 NTSC uncompressed images on a single optical disk (43,500 images per side). Therefore, a laser disk recorder, in accordance with the present invention, may record on a single optical disk as many as 43,500 uncompressed high-resolution monochrome images which have a 14 MHz bandwidth (21,750 images per side).

During reproduction of high-resolution monochrome images stored on a record medium, player 14 (as before, it is appreciated that recorder 14 includes a playback capability, and to avoid confusion, the recorder is referred to as a player when describing a reproduction operation) sequentially reproduces each of the two sampled signals corresponding to a single high-resolution monochrome image, and supplies the reproduced video signals to video switch 38. Video switch 38 is a two-state selectable switch that supplies the reproduced signal to two frame storage device 40 which stores the reproduced first and second sampled signals $S_1$ and $S_2$ in frame storage units 40A and 40B, respectively. Similar to video switch 32, video switch 40 may be manually or automatically controlled.

Similar to frame storage units 18A, 18B, 18C (FIG. 3), frame storage units 40A and 40B of storage device 40 may include frame capture circuit boards, or the equivalent, which are capable of "grabbing" a monochrome video signal having a 7 MHz bandwidth. Video camera 30 supplies a pixel clock signal to storage device 40 to synchronize storage of the reproduced signals.

Upon "grabbing" the respective sampled signals, the two frame storage units 40A and 40B supply the two sampled signals to recombining circuit 42 which recombines the signals utilizing clock signals CLK and $\overline{\text{CLK}}$ supplied from clock generating circuit 34 to produce the original high-resolution monochrome video signal. Recombining circuit 42 supplies the recombined signal to a high-resolution monochrome video monitor 44 which displays the high-resolution monochrome video image. Therefore, and in accordance with the present invention, a monochrome video signal having a bandwidth as high as 14 MHz may be recorded and subsequently reproduced and displayed on a high-resolution video monitor.

In accordance with another embodiment of the present invention, monochrome video signals having a bandwidth exceeding 14 MHz may be recorded and reproduced by utilizing three or more frame grabber boards and three-state (or more) type video switches.

While the present invention has been particularly shown and described in conjunction with preferred embodiments thereof, it will be readily appreciated by those of ordinary skill in the art that various changes and modifications may be made without departing from the spirit and scope of the invention. For example, recording and reproduction of high-resolution color and monochrome video signals have been described, however, the present invention is not limited to recording and reproducing video signals and may record and reproduce other types of signals, e.g., audio, which may be recorded and reproduced in accordance with the present invention.

As another example, although the present discussion is directed to a laser disk recorder, the present invention is not limited solely to this type of device and may be widely applied to other types of recording devices, e.g., magnetic recorders.

Therefore, it is intended that the appended claims be interpreted as including the embodiments described herein, the alternatives mentioned above, and all equivalents thereto.

What is claimed is:

1. Apparatus for storing a high-resolution monochrome video signal on a record medium, comprising:

means for receiving a monochrome video signal;

means for supplying a clock signal having pulses at a predetermined clock frequency and for supplying a complement of said clock signal;

means for sampling said monochrome video signal at each pulse of said clock signal to produce a first sampled video signal comprising a first, complete lower resolution version of said monochrome video signal;

means for sampling said monochrome video signal at each pulse of said complement clock signal to produce a second sampled video signal comprising a second, complete lower resolution version of said monochrome video signal, each sample thereof being offset from a corresponding sample of said first, complete lower resolution version by one half of the duration of one pulse of said clock signal; and means for recording said first and second sampled video signals in respective different areas of said record medium.

2. The apparatus of claim 1, wherein said means for recording is operable to record as separate individual frames each of said first and second sampled video signals.

3. The apparatus of claim 1, wherein a storage capacity of each area of said record medium for storing said first and second signal components of said monochrome video signals corresponds to a frame of a video signal having a predetermined bandwidth; and wherein said means for recording said first and second signal components of said monochrome video signal has a bandwidth exceeding said predetermined bandwidth.

4. The apparatus of claim 1, further comprising means for supplying said first and second sampled video signals at respective different time intervals to said means for recording.

5. The apparatus of claim 1, wherein said means for recording is operable to record a high-resolution monochrome video image having at least a 7 MHz bandwidth.

6. The apparatus of claim 1, wherein said means for recording is operable to record at least 20,000 monochrome video images each having at least a 7 MHz bandwidth onto a single record medium.

7. The apparatus of claim 1, wherein said record medium is an analog-type storage device.

8. The apparatus of claim 1, wherein said record medium is a write-once laser-type disk.

9. Apparatus for reproducing a monochrome video signal from a record medium, said monochrome video signal having first and second signal components stored in separate respective areas of said record medium, each of said first and second signal components representing a different complete lower resolution version of said monochrome video signal, each of said areas of said record medium storing a single frame of video signal, said apparatus comprising:

means for reproducing said first and second signal components of said monochrome video signal from said separate areas of said record medium;

means for supplying a clock signal having pulses at a predetermined clock frequency and for supplying a complement of said clock signal; and means for combining said reproduced first signal component with said reproduced second signal in accordance with said clock signal and said complement clock signal, respectively, to produce said monochrome video signal, each of a plurality of samples of said first signal component being offset from a corresponding one of a plurality of samples of said second signal component by one half of the duration of one pulse of said clock signal.

10. The apparatus of claim 9, wherein said means for combining includes:

first frame capture means for storing said reproduced first signal component of said monochrome video signal;

second frame capture means for storing said reproduced second signal component of said monochrome video signal; and a combiner supplied with said stored first and second signal components to produce said monochrome video signal.

11. The apparatus of claim 9, wherein said first and second signal components of said monochrome video signal are each reproduced at a respective different time interval.

12. The apparatus of claim 9, wherein said means for reproducing is operable to reproduce as separate frames each of said first and second signal components of said video signal stored on said record medium.

13. The apparatus of claim 9, wherein a storage capacity of each area of said record medium for storing said first and second signal components of said monochrome video signals corresponds to a frame of a video signal having a predetermined bandwidth; and wherein said means for reproducing said first and second signal components of said monochrome video signal has a bandwidth exceeding said predetermined bandwidth.

14. The apparatus of claim 9, wherein said means for reproducing is operable to reproduce a high-resolution monochrome video image having at least a 7 MHz bandwidth.

15. The apparatus of claim 9, wherein said means for reproducing is operable to reproduce at least 20,000 color video images each having at least a 7 MHz bandwidth from a single record medium.

16. The apparatus of claim 9, wherein said means for reproducing is operable to reproduce a monochrome video image having at least a 7 MHz bandwidth stored on said record medium within one second.

17. Method of storing a high-resolution monochrome video signal on a record medium, comprising the steps of:

receiving a monochrome video signal;

supplying a clock signal having pulses at a predetermined clock frequency and supplying a complement of said clock signal;

sampling said monochrome video signal at each pulse of said clock signal to produce a first sampled video signal comprising a first, complete lower resolution version of said monochrome video signal;

sampling said monochrome video signal at each pulse of said complement clock signal to produce a second sampled video signal comprising a second, complete lower resolution version of said monochrome video signal, each sample thereof being offset from a corresponding sample of said first, complete lower resolution version by one half of the duration of one pulse of said clock signal; and recording said first and second sampled video signals in respective different areas of said record medium.

18. Method of reproducing a monochrome video signal from a record medium, said monochrome video signal having first and second signal components stored in separate respective areas of said record medium, each of said areas of said record medium storing a single frame of video signals, each of said first and second signal components representing a different, complete lower resolution version of said monochrome video signal; said method comprising the steps of:

reproducing said first and second signal components of said monochrome video signal from said separate areas of said record medium;

supplying a clock signal having pulses at a predetermined clock frequency and supplying a complement of said clock signal; and combining said reproduced first signal component with said reproduced second signal in accordance with said clock signal and said complement clock signal, respectively, to produce said monochrome video signal, each of a plurality of samples of said first signal component being offset from a corresponding one of a plurality of samples of said second signal component by one half the duration of one pulse of said clock signal.

* * * * *